United States Patent
Chen et al.

(10) Patent No.: US 12,474,409 B2
(45) Date of Patent: Nov. 18, 2025

(54) METHOD AND SYSTEM FOR ESTIMATING STATE OF HEALTH (SOH) OF BATTERY PACK FOR HOUSEHOLD ENERGY STORAGE

(71) Applicant: FranklinWH Energy Storage Inc., San Jose, CA (US)

(72) Inventors: Peiming Chen, Shenzhen (CN); Daqing Wang, Shenzhen (CN)

(73) Assignee: FranklinWH Energy Storage Inc., San Jose, CA (US)

( * ) Notice: Subject to any disclaimer, the term of this patent is extended or adjusted under 35 U.S.C. 154(b) by 215 days.

(21) Appl. No.: 18/350,399

(22) Filed: Jul. 11, 2023

(65) Prior Publication Data

US 2023/0366945 A1 Nov. 16, 2023

Related U.S. Application Data

(63) Continuation of application No. PCT/CN2022/092754, filed on May 13, 2022.

(51) Int. Cl.
*G01R 31/387* (2019.01)
*G01R 31/36* (2020.01)

(52) U.S. Cl.
CPC ....... *G01R 31/387* (2019.01); *G01R 31/3648* (2013.01)

(58) Field of Classification Search
CPC .......... G01R 31/3648; G01R 31/387; G01R 31/392; G01R 31/003; G01R 31/12; Y02E 60/10; Y02E 60/50; Y02E 10/549

See application file for complete search history.

(56) References Cited

U.S. PATENT DOCUMENTS

| | | | |
|---|---|---|---|
| 6,359,419 B1 * | 3/2002 | Verbrugge | B60K 6/44 320/132 |
| 7,982,433 B2 * | 7/2011 | Lim | G01R 31/3828 320/132 |
| 8,519,674 B2 * | 8/2013 | Anderson | G01R 31/392 320/132 |
| 10,948,548 B2 * | 3/2021 | Gao | G01R 31/388 |
| 11,293,988 B2 * | 4/2022 | Kim | G01R 31/3648 |
| 11,567,141 B2 * | 1/2023 | Kim | G01R 31/388 |
| 11,728,661 B2 * | 8/2023 | Kirleis | B60L 3/0046 320/121 |

* cited by examiner

*Primary Examiner* — Vinh P Nguyen
(74) *Attorney, Agent, or Firm* — ANOVA LAW GROUP, PLLC

(57) ABSTRACT

A method for estimating a state of health (SOH) of a battery pack includes estimating a number of charge and discharge cycles of the battery pack; calculating a first SOH of the battery pack by using the number of charge and discharge cycles; calculating a number of service years of the battery pack; calculating a second SOH of the battery pack by using the number of service years; calculating a limit discharge capacity of the battery pack; calculating a third SOH of the battery pack by using the limit discharge capacity; and comparing a value of the first SOH, a value of the second SOH, and a value of the third SOH and taking a minimum value as the SOH of the battery pack.

13 Claims, 6 Drawing Sheets

METHOD AND SYSTEM FOR ESTIMATING STATE OF HEALTH (SOH) OF BATTERY PACK FOR HOUSEHOLD ENERGY STORAGE

CROSS-REFERENCES TO RELATED APPLICATION(S)

This application is a continuation application of International Patent Application No. PCT/CN2022/092754, filed on May 13, 2022, the content of which is incorporated herein by reference in its entirety.

TECHNICAL FIELD

The present application relates to the field of household energy storage and, in particular, to a method for estimating a state of health (SOH) of a battery pack and a household energy storage system.

BACKGROUND

A state of health (SOH) refers to the limit capacity, health, and performance state of a battery. Generally, the ratio of a performance parameter after the battery has been used for a period of time to a nominal parameter is used as the SOH of the battery. The SOH of the battery gradually decreases as the battery is repeatedly used.

Since a battery system is often composed of multiple battery packs, each battery pack generally includes multiple batteries, and the battery pack has poor cell consistency between different batteries, the battery pack SOH estimation is difficult and inaccurate.

In addition, the lack of communication between components in a household energy storage system often occurs and the uncontrollability of the load access time, charge current, discharge current, and the like generally results in a battery management system (BMS) of the household energy storage system difficulty performing charge and discharge calculation cycles actively, thereby increasing the difficulty of the battery pack SOH estimation.

SUMMARY

Embodiments of the present application provide a method for estimating an SOH of a battery pack and a household energy storage system, so as to improve the accuracy of estimation of the SOH of the battery pack.

To solve the preceding technical problems, an embodiment of the present application provides a method for estimation an SOH of a battery pack. The method for estimating an SOH of a battery pack includes the steps described below.

The number of charge and discharge cycles of the battery pack is estimated.

A first SOH of the battery pack is calculated by using the number of charge and discharge cycles.

The number of service years of the battery pack is calculated.

A second SOH of the battery pack is calculated by using the number of service years.

A limit discharge capacity of the battery pack is calculated.

A third SOH of the battery pack is calculated by using the limit discharge capacity.

A value of the first SOH, a value of the second SOH, and a value of the third SOH are compared and the minimum value is taken as the SOH of the battery pack.

To solve the preceding technical problems, an embodiment of the present application provides a household energy storage system. The household energy storage system includes a cloud platform, an energy management system (EMS), a battery management system (BMS), a battery system, and a power conversion system (PCS).

The EMS is configured to perform data interaction with the BMS, the PCS, and the cloud platform, the battery system includes at least one battery pack, and the household energy storage system is configured to perform the steps described below.

The number of charge and discharge cycles of the battery pack is estimated.

A first SOH of the battery pack is calculated by using the number of charge and discharge cycles.

The number of service years of the battery pack is calculated.

A second SOH of the battery pack is calculated by using the number of service years.

A limit discharge capacity of the battery pack is calculated.

A third SOH of the battery pack is calculated by using the limit discharge capacity.

A value of the first SOH, a value of the second SOH, and a value of the third SOH are compared and the minimum value is taken as an SOH of the battery pack.

In the method for estimating the SOH of the battery pack and the household energy storage system provided in the embodiments of the present application, the SOH of the battery pack is estimated according to the SOH in multiple dimensions so that the limitation of using a single method for estimating the SOH of the battery pack is avoided, and errors in estimating the SOH of the battery pack are reduced, thereby improving the accuracy of estimation of the SOH of the battery pack.

BRIEF DESCRIPTION OF DRAWINGS

To illustrate the technical solutions in the embodiments of the present application more clearly, the drawings used in description of the embodiments of the present application are briefly described below. Apparently, the drawings described below illustrate part of the embodiments of the present application, and those of ordinary skill in the art may obtain other drawings based on the drawings described below on the premise that no creative work is done.

DETAILED DESCRIPTION

Unless otherwise defined, all technical and scientific terms used herein have meanings the same as those commonly understood by those skilled in the art to which the present application pertains. The terms used in the specification of the present application are for the purpose of describing embodiments only and are not intended to limit the present application. The terms "comprising", "including", or any other variations thereof described in the specification, claims, and drawings of the present application are intended to encompass a non-exclusive inclusion. The terms such as "first" and "second" in the description, claims, and drawings of the present application are used to distinguish between different objects and not to describe a particular order.

"Embodiment" mentioned throughout the present application means that a particular feature, structure, or characteristic described in conjunction with the embodiments may be included in at least one embodiment of the present application. This phrase occurred in various locations in the specification is not necessarily to refer to a same embodiment, nor is an independent or alternative embodiment that is mutually exclusive from other embodiments. It is explicitly and implicitly appreciated by those skilled in the art that embodiments described herein may be combined with other embodiments.

The technical solutions in the embodiments of the present application are described hereinafter clearly and completely in conjunction with the drawings in the embodiments of the present application. Apparently, the described embodiments are part, not all, of the embodiments of the present application. Based on the embodiments in the present application, all other embodiments obtained by those of ordinary skill in the art on the premise that no creative work is done are within the scope of the present application.

Figure 1:
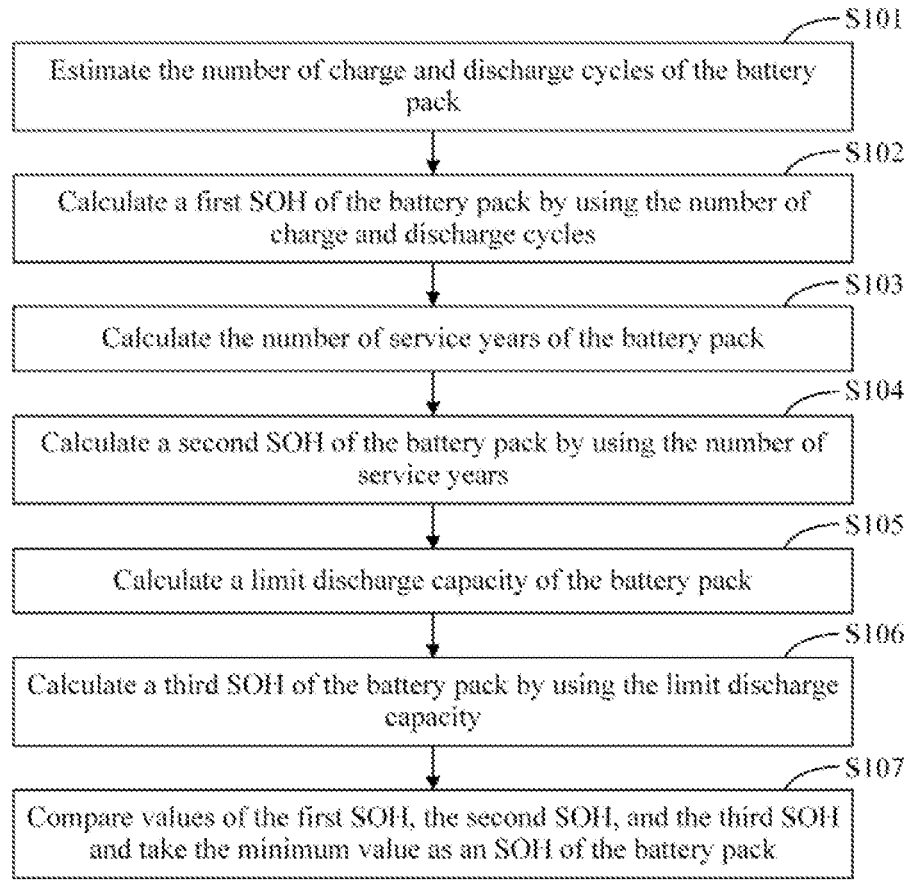
FIG. 1 is a flowchart of a method for estimating an SOH of a battery pack according to an embodiment of the present application.

Referring to FIG. 1, FIG. 1 shows a method for estimating an SOH of a battery pack according to an embodiment of the present application. The hardware environment in which the method is performed is a household energy storage system equipped with a computer for storing and executing computer instructions. The hardware of the computer includes, but is not limited to, a microprocessor, an application-specific integrated circuit (ASIC), a field-programmable gate array (FPGA), a digital signal processor (DSP), an embedded device, and the like. The form of the computer is not limited to a desktop computer, a laptop computer, a palmtop computer, a cloud server, and the like.

In S101, the number of charge and discharge cycles of the battery pack is estimated.

The battery pack includes one or more units of cell packs, and each unit of cell packs includes a number of cells and a data acquisition unit for acquiring cell information.

The number of charge and discharge cycles refers to the accumulated number of switches of a battery system from a full load state to a preset load-free state or from the preset load-free state to the full load state. For example, when the number of switches of the battery from the full load state to the preset load-free state is 20, the number of charge and discharge cycles is 20.

In S102, a first SOH of the battery pack is calculated by using the number of charge and discharge cycles.

The first SOH refers to a value calculated by using the number of charge and discharge cycles and indicating the SOH of the battery pack, and the first SOH is generally a percentage or a decimal greater than or equal to 0 and less than or equal to 1.

In S103, the number of service years of the battery pack is calculated.

The number of service years refers to the number of years of use of the battery pack from its delivery to the SOH estimation. For example, 0.5 years are recorded as 0.5, 1 year is recorded as 1, and 2.5 years are recorded as 2.5.

In S104, a second SOH of the battery pack is calculated by using the number of service years.

The second SOH refers to a value calculated by using the number of service years and indicating the SOH of the battery pack, and the second SOH is generally a percentage or a decimal greater than or equal to 0 and less than or equal to 1.

In S105, a limit discharge capacity of the battery pack is calculated.

The limit discharge capacity of the battery pack refers to the capacity discharged when the battery pack is discharged from a full charge state to a cut-off voltage. As the life of the battery pack increases, the limit discharge capacity decreases.

In S106, a third SOH of the battery pack is calculated by using the limit discharge capacity.

The third SOH refers to a value calculated by using the limit discharge capacity and indicating the SOH of the battery pack, and the third SOH is generally a percentage or a decimal greater than or equal to 0 and less than or equal to 1.

In S107, a value of the first SOH, a value of the second SOH, and a value of the third SOH are compared and the minimum value is taken as an SOH of the battery pack.

It is to be noted herein that the execution order of S101 to S106 may be adjusted adaptively according to actual requirements, and the embodiment of the present application provides one of the execution orders.

In the method for estimating an SOH of a battery pack provided in the embodiment of the present application, the SOH of the battery pack is estimated according to the SOH in multiple dimensions so that the limitation of using a single method for estimating the SOH of the battery pack is avoided. The minimum value among the first SOH, the second SOH, and the third SOH is taken as the SOH of the battery pack so that the falsely high SOH of the battery pack can be avoided to the maximum extent. When the SOH of battery pack is falsely high, the household energy storage system easily makes a wrong determination, seriously affecting the normal operation of the household energy storage system and user experience.

Figure 2:
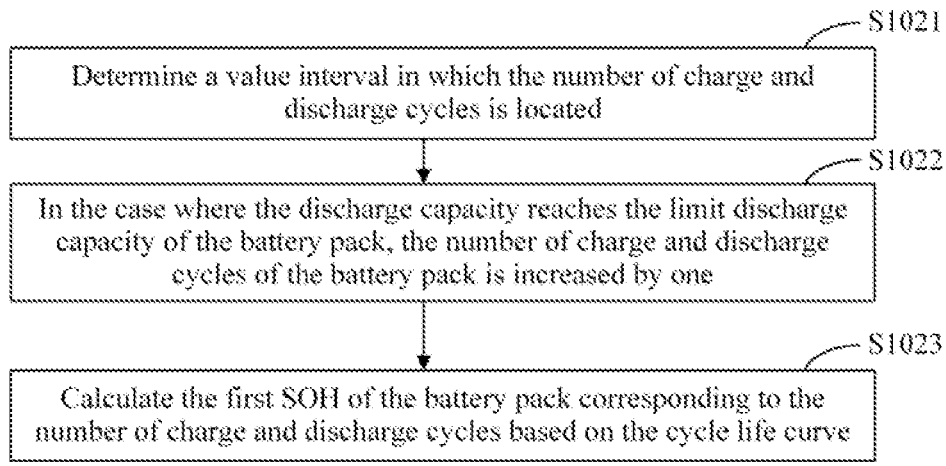
FIG. 2 is another flowchart of a method for estimating an SOH of a battery pack according to an embodiment of the present application.

In some optional implementations of this embodiment, as shown in FIG. 2, the S101 of estimating the number of charge and discharge cycles of the battery pack includes S1011 to S1013.

In S1011, a discharge capacity of the battery pack is accumulated.

In S1012, in the embodiment where the discharge capacity reaches the limit discharge capacity of the battery pack, the number of charge and discharge cycles of the battery pack is increased by one.

In S1013, the discharge capacity is cleared.

After the discharge capacity is cleared, the process returns to step S1011 in which the discharge capacity of the battery pack is accumulated.

The accumulated discharge capacity of the battery pack refers to the accumulated discharge capacity used from the start of use of the battery.

The limit discharge capacity refers to the capacity discharged when the battery pack is discharged from the full charge state to the cut-off voltage. As the life of the battery pack increases, the limit discharge capacity decreases.

Since the battery is not completely cycled every charge and discharge, the number of charge and discharge cycles may be estimated by accumulating a discharge capacity of the battery pack or a charge capacity of the battery pack. In the embodiment of the present application, the number of charge and discharge cycles is estimated by calculating the accumulated discharge capacity of the battery, and then a cycle life is calculated.

It is to be noted herein that the cycle life refers to the time required for the battery to reach the end of life during a duty cycle or a regular cycle.

The method for estimating the number of charge and discharge cycles includes, but is not limited to, a cycle method and a capacity method. The cycle method refers to a calculation method in which the number of charge and discharge cycles is regarded as charge cycles. When the battery undergoes a complete charge cycle, the number of charge and discharge cycles is increased by one. The capacity method refers to a method for calculating the number of charge and discharge cycles according to the accumulated discharge capacity and the limit discharge capacity of the battery.

Preferably, in the embodiment of the present application, the number of charge and discharge cycles is calculated by using the accumulated discharge capacity and the limit discharge capacity. Every time the accumulated discharge capacity reaches the limit discharge capacity, a cycle is recorded, and the accumulated discharge capacity is cleared and re-accumulated from 0. The number of charge and discharge cycles is equivalent to dividing the accumulated discharge capacity by the limit discharge capacity and rounding down. For example, in the embodiment where the limit discharge capacity is 14 and the accumulated discharge capacity reaches 14, the number of cycles is increased by 1, and the accumulated discharge capacity is cleared and re-accumulated from 0 until the accumulated discharge capacity reaches 14 again.

It is to be noted herein that the limit discharge capacity is equal to an initial discharge capacity of the battery at the time of delivery, that is, $C_{real}=C_{init}$, and then the limit discharge capacity is corrected when a correction condition for the limit discharge capacity is satisfied during use of the battery.

The discharge capacity is cleared to re-accumulate the discharge capacity, thereby calculating the number of charge and discharge cycles.

In the embodiment of the present application, the accumulated discharge capacity and the limit discharge capacity of the battery are acquired, and the number of charge and discharge cycles is calculated according to the accumulated discharge capacity and the limit discharge capacity of the battery, which is conducive to using the number of charge and discharge cycles to calculate the first SOH of the battery pack, thereby improving the accuracy of estimation of the SOH of the battery pack.

Figure 3:
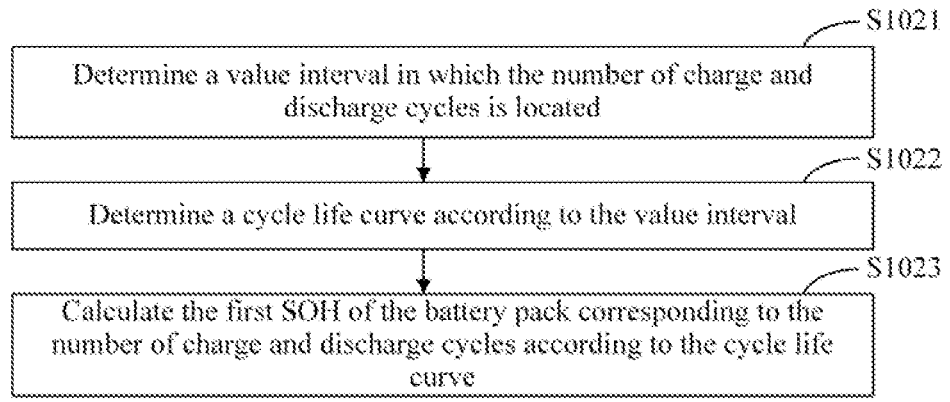
FIG. 3 is another flowchart of a method for estimating an SOH of a battery pack according to an embodiment of the present application.

In some optional implementations of this embodiment, as shown in FIG. 3, the S102 of calculating the first SOH of the battery pack by using the number of charge and discharge cycles includes S1021 to S1023.

In S1021, a value interval in which the number of charge and discharge cycles is located is determined.

In S1022, a cycle life curve is determined according to the value interval.

In S1023, the first SOH of the battery pack corresponding to the number of charge and discharge cycles is calculated according to the cycle life curve.

The method for determining the value interval in which the number of charge and discharge cycles is located includes comparison and determination, where the comparison and determination mean that the number of charge and discharge cycles is separately compared with two boundary points of each value interval corresponding to the cycle life curve, and if the number of charge and discharge cycles just falls between the two boundary points, the value interval is determined to be the value interval in which the number of charge and discharge cycles is located.

The method for calculating the first SOH of the battery pack by using the number of charge and discharge cycles includes, but is not limited to, empirical value acquisition and cycle life decay curve acquisition.

It is to be understood that the empirical value acquisition refers to acquiring a SOH value corresponding to the number of charge and discharge cycles according to manual experience, and the cycle life decay curve acquisition refers to acquiring a correspondence between the number of charge and discharge cycles and the SOH according to test data, that is, acquiring a cycle life decay curve so that if the number of charge and discharge cycles is known, the SOH corresponding to the number of charge and discharge cycles can be determined.

Preferably, in the present application, the first SOH of the battery pack is calculated by using the number of charge and discharge cycles through the cycle life decay curve.

The first SOH of the battery pack is calculated by using the number of charge and discharge cycles through the cycle life decay curve so that the first SOH of the battery pack can be quickly determined, thereby improving the accuracy of estimation of the SOH of the battery pack.

Figure 4:
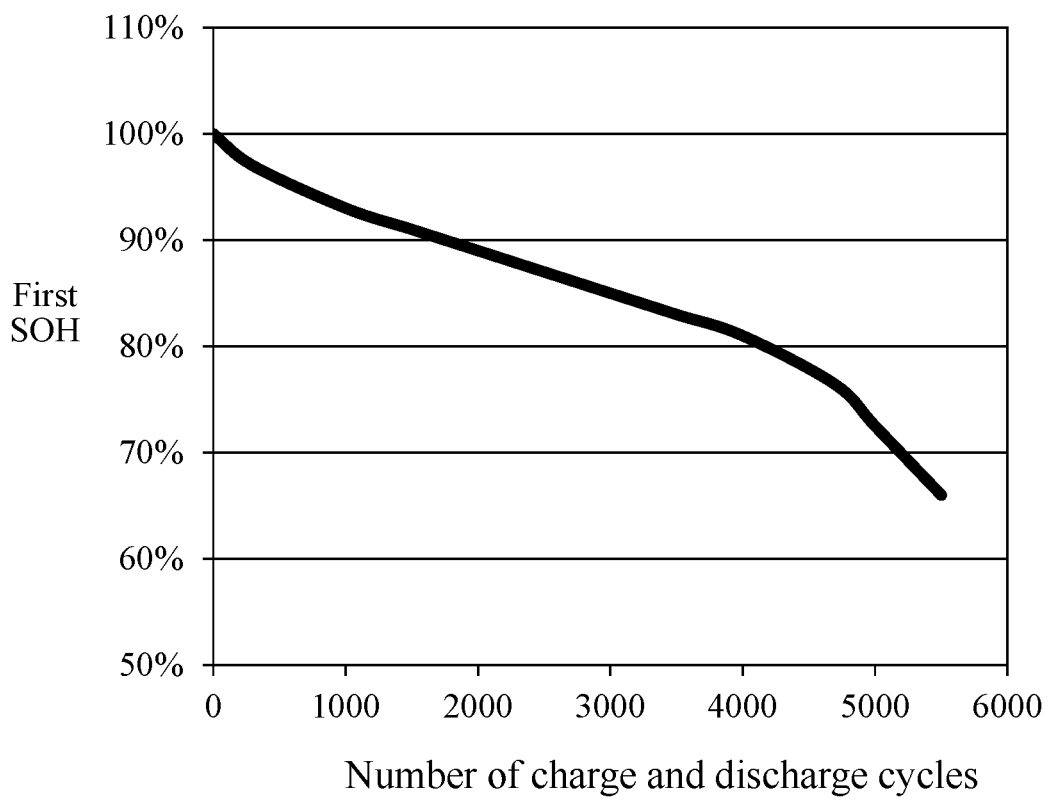
FIG. 4 is a schematic diagram of a cycle life curve of a method for estimating an SOH of a battery pack according to the present application.

As shown in FIG. 4, the cycle life curve is expressed according to the formula (1) described below.

$$f(x) = \begin{cases} 100 - x/100, & x \leq 500 \\ 97 - x/250, & 500 < x \leq 4500 \\ 137.5 - 0.013x, & x > 4500 \end{cases} \quad (1)$$

Where x denotes the number of charge and discharge cycles, and f(x) denotes the first SOH of the battery pack corresponding to the number of charge and discharge cycles.

The above formula (1) is a cycle life decay function that can be derived from the test data and configured in software.

It is to be noted herein that the above formula (1) is an example of the cycle life decay function of the embodiment of the present application, may be adaptively modified according to actual requirements, and is not specifically limited.

In this embodiment, the value interval in which the number of charge and discharge cycles is located is determined, the cycle life curve is determined according to the value interval, the first SOH of the battery pack corresponding to the number of charge and discharge cycles can be quickly and accurately calculated according to the cycle life curve, and a cycle life state value is calculated, thereby improving the accuracy of estimation of the SOH of the battery pack.

Figure 5:
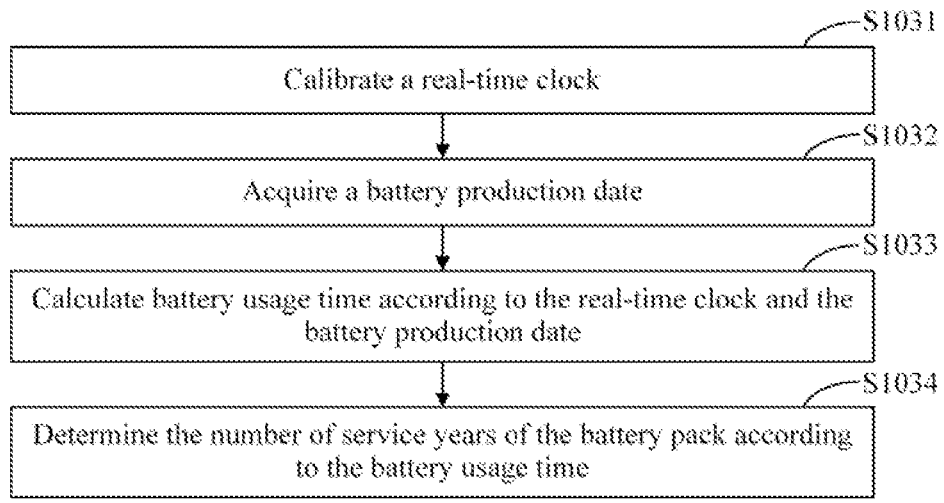
FIG. 5 is another flowchart of a method for estimating an SOH of a battery pack according to an embodiment of the present application.

In some optional implementations of this embodiment, as shown in FIG. 5, the S103 of calculating the number of service years of the battery pack includes S1031 to S1034.

In S1031, a real-time clock is calibrated.

In S1032, a battery production date is acquired.

In S1033, battery usage time is calculated according to the real-time clock and the battery production date.

In S1034, the number of service years of the battery pack is determined according to the battery usage time.

The battery usage time refers to the time elapsed from the production date to the current date of the battery.

The method for determining the number of service years of the battery pack is to subtract the production date from the current date to obtain a date difference and normalize the date difference to obtain the number of service years. Normalization refers to a processing method of converting the date difference into a format required by the present application. Preferably, the date difference is converted into a value in units of years. For example, when the date difference is 365, the number of service years of the battery is 1 year after the normalization process.

The execution order of S1031 to S1034 may be adjusted adaptively according to actual requirements, and the embodiment of the present application provides one of the execution orders.

In the embodiment of the present application, the battery production date is acquired by calibrating the real-time clock, the battery usage time is calculated according to the real-time clock and the battery production date, and the number of service years of the battery pack is determined according to the battery usage time, which is conducive to calculating the second SOH of the battery pack by using the number of service years, thereby improving the accuracy of estimation of the SOH of the battery pack.

Figure 6:
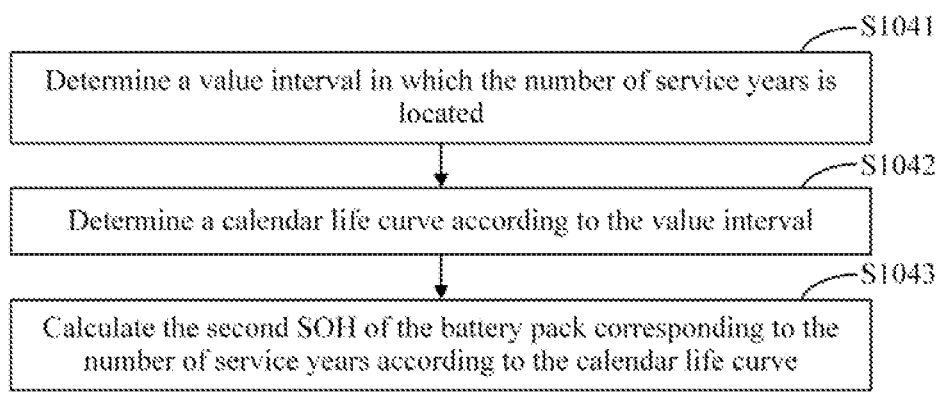
FIG. 6 is another flowchart of a method for estimating an SOH of a battery pack according to an embodiment of the present application.

In some optional implementations of this embodiment, as shown in FIG. 6, the S104 of calculating the second SOH of the battery pack by using the number of service years includes S1041 to S1043.

In S1041, a value interval in which the number of service years is located is determined.

In S1042, a calendar life curve is determined according to the value interval.

In S1043, the second SOH of the battery pack corresponding to the number of service years is calculated according to the calendar life curve.

The method for determining the value interval in which the number of service years is located includes comparison and determination, where the comparison and determination mean that the number of service years is separately compared with two boundary points of each value interval corresponding to the calendar life curve, and if the number of service years just falls between the two boundary points, the value interval is determined to be the value interval in which the number of service years is located.

The method for calculating the second SOH of the battery pack by using the number of service years includes, but is not limited to, empirical value acquisition and calendar life decay curve acquisition.

It is to be understood that the empirical value acquisition refers to acquiring a SOH value corresponding to the number of service years according to manual experience, and the calendar life decay curve acquisition refers to acquiring a correspondence between the number of service years and the SOH according to test data, that is, acquiring a calendar life decay curve so that if the number of service years is known, the SOH corresponding to the number of service years can be determined.

Preferably, in the present application, the second SOH of the battery pack is calculated by using the number of service years through the calendar life decay curve.

The second SOH of the battery pack is calculated by using the number of service years through the calendar life decay curve so that the second SOH of the battery pack can be quickly determined, thereby improving the accuracy of estimation of the SOH of the battery pack.

Figure 7:
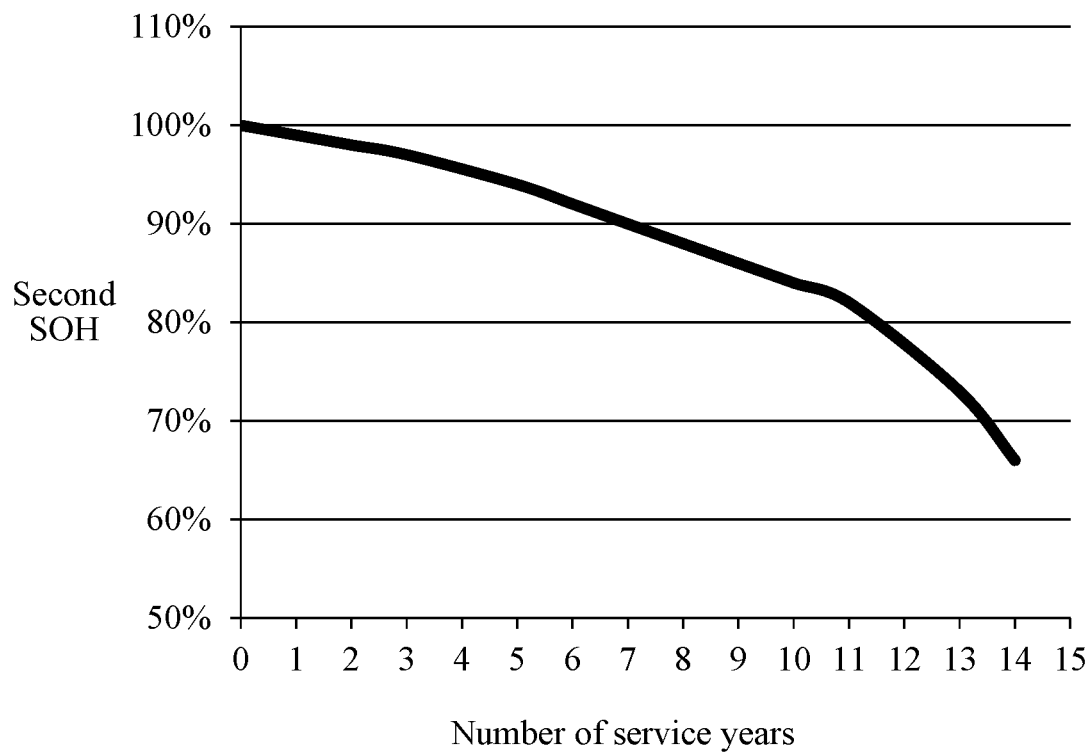
FIG. 7 is a schematic diagram of a calendar life curve of a method for estimating an SOH of a battery pack according to the present application.

As shown in FIG. 7, the calendar life curve is expressed according to the formula (2) described below.

$$f(y) = \begin{cases} 100 - y, & y \le 4 \\ 104 - 2y, & 4 < y \le 12 \\ 164 - 7y, & y > 12 \end{cases} \quad (2)$$

Where y denotes the number of service years of the battery and f (y) denotes the second SOH of the battery pack corresponding to the number of service years.

The above formula (2) is a calendar life decay function that can be derived from the test data and configured in software.

It is to be noted herein that the above formula (2) is an example of the calendar life decay function of the embodiment of the present application, may be adaptively modified according to actual requirements, and is not specifically limited.

The execution order of S1041 to S1043 may be adjusted adaptively according to actual requirements, and the embodiment of the present application provides one of the execution orders.

In this embodiment, the value interval in which the number of service years is located is determined, the calendar life curve is determined according to the value interval, the second SOH of the battery pack corresponding to the number of service years can be quickly and accurately calculated according to the calendar life curve, and a calendar life state value is calculated, thereby improving the accuracy of estimation of the SOH of the battery pack.

Figure 8:
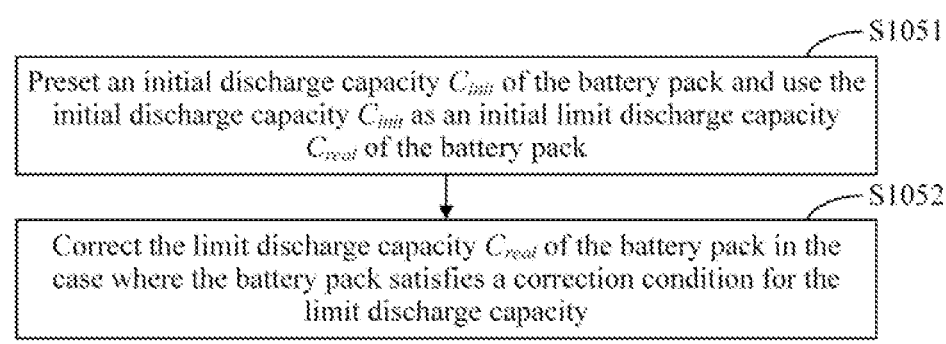
FIG. 8 is another flowchart of a method for estimating an SOH of a battery pack according to an embodiment of the present application.

In some optional implementations of this embodiment, as shown in FIG. 8, the S105 of calculating the limit discharge capacity of the battery pack includes S1051 and S1052.

In S1051, an initial discharge capacity $C_{init}$ of the battery pack is preset and used as an initial limit discharge capacity $C_{real}$ of the battery pack.

In S1052, the limit discharge capacity $C_{real}$ of the battery pack is corrected in the embodiment where the battery pack satisfies a correction condition for the limit discharge capacity.

Before the delivery of the battery, a discharge capacity test of the battery is performed, the capacity is recorded as the initial discharge capacity $C_{init}$, and the initial discharge capacity $C_{init}$ is used as the limit discharge capacity $C_{real}$. As the life of the battery pack increases, the limit discharge capacity decreases.

The correction condition includes, but is not limited to, that the battery pack is discharged from the full charge state to the cut-off voltage in less than 24 hours and temperature of the battery pack is kept at 15 to 45 degrees Celsius, or usage time of the battery pack reaches a preset duration.

The correction condition refers to a condition set by a user, may be specifically set according to actual situations, and is not specifically limited herein. Before the delivery of the battery, the discharge capacity test of the battery is performed, the capacity is recorded as the initial discharge capacity $C_{init}$, and the initial discharge capacity $C_{init}$ is used as the limit discharge capacity $C_{real}$. As the life of the battery pack increases, the limit discharge capacity decreases.

The initial discharge capacity and the limit discharge capacity of the battery are acquired, the limit discharge capacity is calculated according to the initial discharge capacity and the limit discharge capacity of the battery and a preset condition so as to obtain a new limit discharge capacity, and the third SOH of the battery pack is obtained according to the new limit discharge capacity and the initial discharge capacity so that the third SOH of the battery pack can be quickly and accurately calculated, thereby improving the accuracy of estimation of the SOH of the battery pack.

In the embodiment where the correction condition is that the battery pack is discharged from the full charge state to the cut-off voltage in less than 24 hours and the temperature of the battery pack is kept at 15 to 45 degrees Celsius, the step of correcting the limit discharge capacity $C_{real}$ of the battery pack includes the steps described below.

An amount of discharge of the battery pack discharged from the full charge state to the cut-off voltage is counted and the amount of discharge is used as a new limit discharge capacity $C_{new}$.

The new limit discharge capacity $C_{new}$ is given a weight of 60% and the limit discharge capacity $C_{real}$ is given a weight of 40%.

The limit discharge capacity $C_{real}$ is calculated and corrected according to the following formula: $C_{real}=C_{real}*40\%+C_{new}*60\%$.

In the embodiment where the correction condition is satisfied during use of the battery, the battery is discharged from the full charge state to a point calibrating the end of discharge (the minimum cell voltage reaches 2900 mV) in less than 24 hours, the temperature of the battery is kept between 15° C. and 45° C. during discharging, a net discharge capacity during discharging is counted, the limit discharge capacity of the battery is corrected, the newly calculated limit discharge capacity $C_{new}$ of the battery has a weight of 60%, the originally recorded limit discharge capacity $C_{real}$ of the battery has a weight of 40%, and the limit discharge capacity $C_{real}$ of the battery is calculated and corrected according to the following formula: $C_{real}=C_{real}*40\%+C_{new}*60\%$.

In the embodiment where the correction condition is that the usage time of the battery pack reaches the preset duration, the battery pack is charged to the full charge state, the battery pack is discharged from the full charge state to the cut-off voltage after standing for 30 minutes, and the temperature of the battery pack is kept at 15 to 45 degrees Celsius, the step of correcting the limit discharge capacity $C_{real}$ of the battery pack includes the steps described below.

An amount of discharge of the battery pack discharged from the full charge state to the cut-off voltage is counted and the amount of discharge is used as a new limit discharge capacity $C_{new}$.

The new limit discharge capacity $C_{new}$ is given a weight of 100% and the limit discharge capacity $C_{real}$ is given a weight of 0%.

The limit discharge capacity $C_{real}$ is calculated and corrected according to the following formula: $C_{real}=C_{real}*0\%+C_{new}*100\%$.

The preset duration refers to a preset automatic update time.

Preferably, the preset duration in the embodiment of the present application is 0.5 years.

The limit discharge capacity of the battery is calculated once every 0.5 years, so as to prevent an excessive error caused by long-term non-triggered discharge capacity correction during use of the battery. Firstly, the battery is charged to the maximum cell voltage of 3400 mV at 0.35 C, then the current starts to decrease, and the battery is charged to the maximum cell voltage of 3600 mV at 0.05 C at the end of charging. After fully charged, the battery stands for 30 min and then is continuously discharged to the point calibrating the end of discharge (the minimum cell voltage reaches 2900 mV) at 0.5 C, the temperature of the battery is kept between 15° C. and 45° C. during discharging, the net discharge capacity during discharging is counted, the newly calculated limit discharge capacity of the battery is $C_{new}$, and the limit discharge capacity $C_{real}$ of the battery is corrected according to the following formula: $C_{real}=C_{real}*0\%+C_{new}*100\%$.

It is to be noted herein that the method for measuring the limit discharge capacity of the battery includes the step described below.

According to the following formula (3), the sampling of battery charge and discharge currents are performed by using a current sensor, and integral calculation is performed on the currents.

$$C=C_0+\int_0^t Idt \qquad (3)$$

Where C denotes a current integration capacity, $C_0$ denotes an integration capacity at time 0, and I denotes the current.

Figure 9:
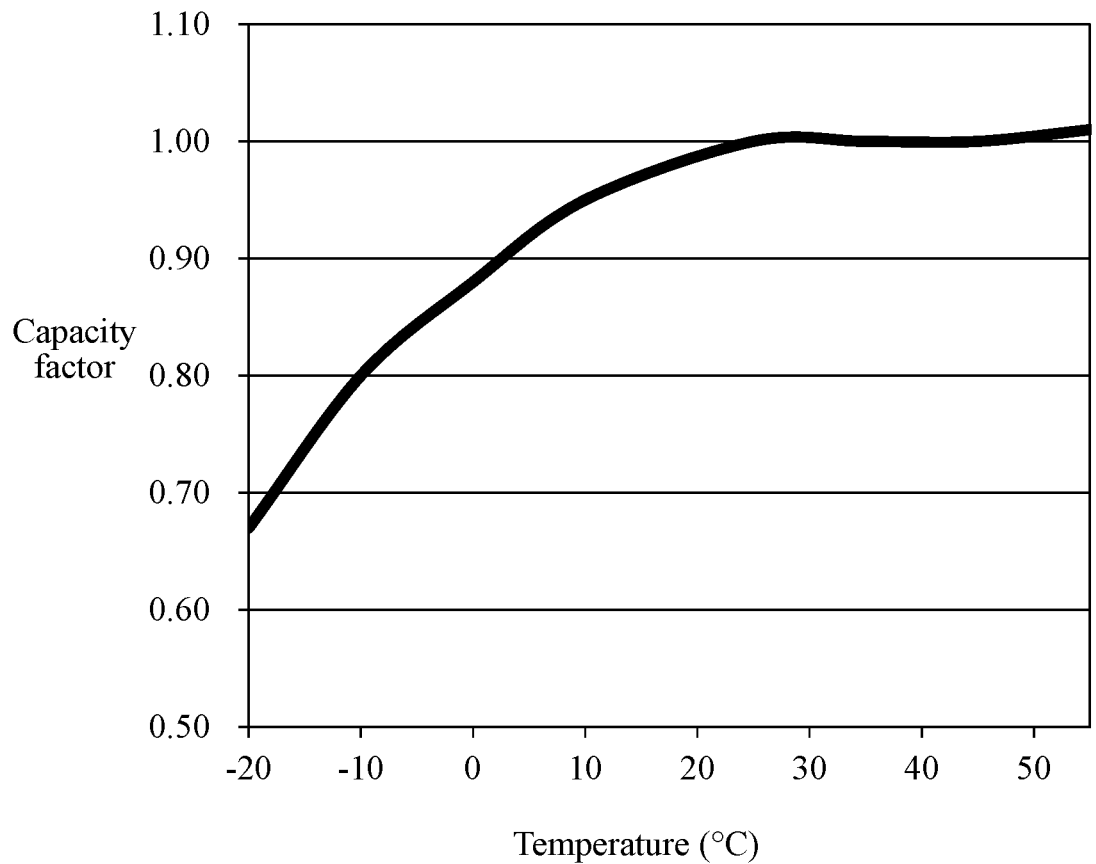
FIG. 9 is a schematic diagram of a temperature-capacity factor curve of a method for estimating an SOH of a battery pack according to the present application.

The limit discharge capacity of a normal-temperature battery is calculated, and the non-normal-temperature limit discharge capacity is corrected by using the limit discharge capacity in conjunction with a temperature coefficient. The interval between 15° C. and 45° C. is used as a normal-temperature interval, and partial data of temperature-capacity factor is described in Table 1. A temperature-capacity factor curve is shown in FIG. 9.

TABLE 1

Partial data of temperature-capacity factor

| | Temperature | | | | | | | | |
|---|---|---|---|---|---|---|---|---|---|
| | −20° C. | −10° C. | 0° C. | 10° C. | 15° C. | 25° C. | 35° C. | 45° C. | 55° C. |
| Temperature-capacity factor | 0.67 | 0.8 | 0.88 | 0.95 | 1.0 | 1.0 | 1.0 | 1.0 | 1.01 |

At the end of charging, the battery is charged at 0.05 C to the maximum cell voltage of 3600 mV, which is considered that the battery is fully charged. The correction condition for the limit discharge capacity during the normal use of the battery is as follows: the battery is discharged from the full charge state to the point calibrating the end of discharge (the minimum cell voltage reaches 2900 mV) in less than 24 hours, and the temperature of the battery is kept between 15° C. and 45° C. during discharging. The net discharge capacity during discharging is counted, the discharge capacity, that is, the newly calculated limit discharge capacity $C_{new}$ of the battery, has a weight of 60%, the originally recorded limit discharge capacity $C_{real}$ of the battery has a weight of 40%, and the limit discharge capacity $C_{real}$ of the battery is calculated and corrected according to the following formula: $C_{real}=C_{real}*40\%+C_{new}*60\%$. The correction condition for the limit discharge capacity when the capacity is calculated is described. Firstly, the battery is charged to the maximum cell voltage of 3400 mV at 0.35 C, then the current starts to decrease, and the battery is charged to the maximum cell voltage of 3600 mV at 0.05 C at the end of charging. After fully charged, the battery stands for 30 min and then is continuously discharged to the point calibrating the end of discharge (the minimum cell voltage reaches 2900 mV) at 0.5 C, the temperature of the battery is kept between 15° C. and 45° C. during discharging, the net discharge capacity during discharging is counted, the discharge capacity, that is, the newly calculated limit discharge capacity $C_{new}$ of the battery, has a weight of 60%, the originally recorded limit discharge capacity $C_{real}$ of the battery has a weight of 0%, and the limit discharge capacity $C_{real}$ of the battery is calculated and corrected according to the following formula: $C_{real}=C_{real}*0\%\ C_{new}*100\%$.

In the embodiment of the present application, the limit discharge capacity of the battery pack is calculated, which is conducive to calculating the third SOH of the battery pack by using the limit discharge capacity, thereby improving the accuracy of estimation of the SOH of the battery pack.

In some optional implementations of this embodiment, the S106 of calculating the third SOH of the battery pack by using the limit discharge capacity includes the step described below.

A percentage obtained by dividing the limit discharge capacity $C_{real}$ by the initial discharge capacity $C_{init}$ is used as the third SOH of the battery pack.

Specifically, the third SOH is equal to $C_{real}/C_{init}*100\%$.

In the embodiment of the present application, the third SOH of the battery pack can be quickly calculated through the percentage obtained by dividing the limit discharge capacity $C_{real}$ by the initial discharge capacity $C_{init}$, thereby improving the accuracy of estimation the SOH of the battery pack.

Figure 10:
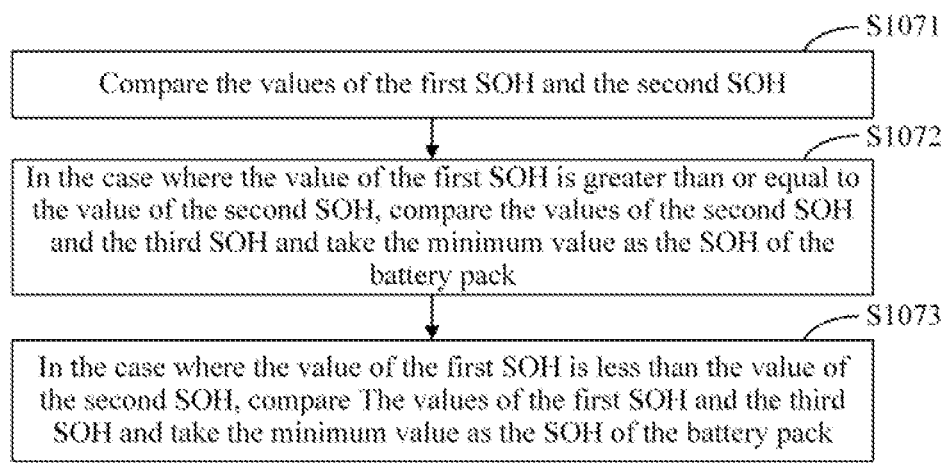
FIG. 10 is another flowchart of a method for estimating an SOH of a battery pack according to an embodiment of the present application.

In some optional implementations of this embodiment, as shown in FIG. 10, the S107 of comparing the value of the first SOH, the value of the second SOH, and the value of the third SOH and taking the minimum value as the SOH of the battery pack includes S1071 to S1073.

In S1071, the value of the first SOH and the value of the second SOH are compared.

In S1072, in the embodiment where the value of the first SOH is greater than or equal to the value of the second SOH, the value of the second SOH and the value of the third SOH are compared and the minimum value is taken as the SOH of the battery pack.

In S1073, in the embodiment where the value of the first SOH is less than the value of the second SOH, the value of the first SOH and the value of the third SOH are compared and the minimum value is taken as the SOH of the battery pack.

Specifically, the method for selecting the minimum value includes, but is not limited to, a comparison method and a sorting method.

Three SOHs obtained in the embodiment of the present application are used as examples. The comparison method refers to a method of comparing the first SOH with the second SOH to obtain a smaller value as an intermediate value and comparing the intermediate value with the third SOH to obtain a smaller value as the minimum value. The sorting method refers to a method of sorting the first SOH, the second SOH, and the third SOH according to a preset order to obtain a sorting sequence and selecting the minimum value from the sorting sequence, where the preset order includes sorting from small to large and sorting from large to small, is specifically determined according to actual situations, and is not limited herein.

It is to be understood that, due to the poor cell consistency of the battery, selecting the minimum value among the SOHs is conducive to uniformly estimating the SOH of the battery pack, thereby improving the accuracy of prediction of the SOH of the battery pack.

The minimum value among all the SOHs is selected as the SOH of the battery pack, and the SOH of the battery pack is determined by comparing the values of the first SOH, the second SOH, and the third SOH so that the limitation of using a single method for estimating the SOH of the battery pack is avoided, thereby improving the accuracy of estimation of the SOH of the battery pack.

In some optional implementations of this embodiment, a method for estimating an SOH of a battery pack further includes the step described below.

An average value of the first SOH, the second SOH, and the third SOH is used as the SOH of the battery pack.

The average value of the first SOH, the second SOH, and the third SOH is used as the SOH of the battery pack so that errors in estimating the SOH of the battery pack are reduced, thereby improving the accuracy of estimation of the SOH of the battery pack.

It is to be understood that in the preceding embodiments, the serial numbers of the steps do not mean the execution order, and the execution order of the processes should be determined according to their functions and internal logics, which should not limit the implementation processes of the embodiments of the present application in any improper way.

Figure 11:
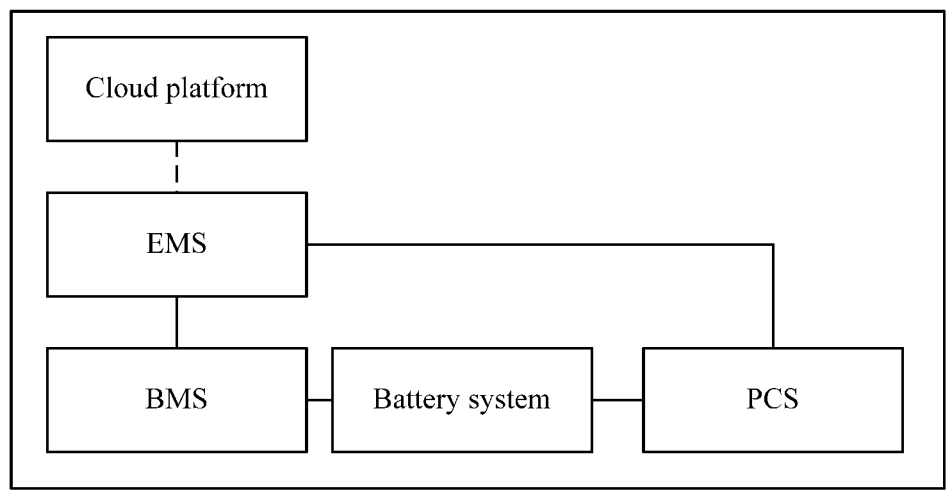
FIG. 11 is an architecture diagram of a household energy storage system according to an embodiment of the present application.

Referring to FIG. 11, FIG. 11 shows a household energy storage system provided in an embodiment of the present application. The household energy storage system is configured to perform the method for estimating an SOH of a battery pack as shown in FIG. 1 and includes a cloud platform, an EMS, a BMS, a battery system, and a PCS.

The EMS is configured to perform data interaction with the BMS, the PCS, and the cloud platform, the battery system includes at least one battery pack, and the household energy storage system is configured to perform the steps described below.

The number of charge and discharge cycles of the battery pack is estimated.

A first SOH of the battery pack is calculated by using the number of charge and discharge cycles.

The number of service years of the battery pack is calculated.

A second SOH of the battery pack is calculated by using the number of service years.

A limit discharge capacity of the battery pack is calculated.

A third SOH of the battery pack is calculated by using the limit discharge capacity.

A value of the first SOH, a value of the second SOH, and a value of the third SOH are compared and the minimum value is taken as an SOH of the battery pack.

Specifically, the cloud platform is connected to the EMS and used for receiving system state information uploaded by the EMS and controlling the household energy storage system through the EMS.

The EMS is separately connected to the PCS and the BMS and used for receiving information uploaded by the PCS and the BMS, monitoring the system state information about the household energy storage system in real time, and controlling the PCS and the BMS.

The battery system is located between the PCS and the BMS and connected to the PCS and the BMS, where the BMS is used for receiving control information about the EMS and controlling power conversion of the PCS and the charge and discharge cycles of the battery system according to the control information.

Further, the cloud platform is configured to provide computing, networking, and storage capabilities according to services of hardware and software resources.

The EMS is configured to help industrial production enterprises to rationally plan and use energy, reduce energy consumption per unit product, improve economic efficiency, and reduce $CO_2$ emission, which are the purpose of information-based management and control household energy storage system, while production is expanded.

The PCS is configured to convert an alternating current into a battery-rechargeable direct-current voltage so as to charge the battery and, when the battery is discharged, convert the battery direct current into an alternating current power supply which can be connected to the network and used at home, so as to achieve that the power supply parameter satisfies the predetermined requirements of the household energy storage system, and at the same time, achieve power supply communication and information acquisition.

The BMS is configured as a unit device for battery charge and discharge management and signal acquisition of the battery so that the battery pack can actively perform the charge and discharge cycle for calculating an actual discharge capacity periodically in conjunction with the role of the household energy storage system.

The EMS communicates with the PCS and the BMS through a controller area network (CAN) for real-time data interaction. The PCS and the BMS upload the current state information of their respective components to the EMS in real time. The EMS monitors the system state in real time according to the received information and can issue a system control command to the PCS and the BMS. The cloud platform communicates with the EMS through the fourth generation of broadband cellular network technology (4G) or Wi-Fi, the EMS uploads the system state information to the cloud platform in real time, and the cloud platform can issue a command to the EMS remotely so as to achieve system control.

The cloud platform, the EMS, the BMS, the battery system, and the PCS are connected so that the information of each component is unified, communication interaction is increased, the access of an external charger and a load is controlled, for example an access time, a charge current, and a discharge current of the external charger and a load is controlled, and the charge and discharge cycle of the battery is achieved.

The household energy storage system is used for achieving the charge and discharge cycle of the battery, where the step of achieving the charge and discharge cycle of the battery includes the steps described below.

A battery charging request is sent to the EMS through the cloud platform.

The EMS controls the PCS to charge the battery in the battery system until the battery is fully charged.

When the battery is fully charged for a preset time period, the EMS controls the PCS to discharge the battery in the battery system until the battery is completely discharged.

Specifically, the cloud platform pushes a battery maintenance request to the EMS. After receiving the battery maintenance request command, the EMS controls the PCS to charge the system (taking power from the power grid or photovoltaic power) until the battery is fully charged. After the battery stands for a certain time period, the EMS controls the PCS to discharge the system (discharging to the load or power grid) until the battery is completely discharged. During the preceding process, the BMS counts the charge and discharge capacity in real time.

Through the preceding process, the charge and discharge cycle of the battery is achieved, thereby improving the physical basis for calculating the actual discharge capacity.

The household energy storage system is specifically configured to, when estimating the number of charge and discharge cycles of the battery pack, perform the steps described below.

A discharge capacity of the battery pack is accumulated.

In the embodiment where the discharge capacity reaches the limit discharge capacity of the battery pack, the number of charge and discharge cycles of the battery pack is increased by one.

The discharge capacity is cleared and the discharge capacity of the battery pack is re-accumulated.

The household energy storage system is specifically configured to, when calculating the first SOH of the battery pack by using the number of charge and discharge cycles, perform the steps described below.

A value interval in which the number of charge and discharge cycles is located is determined.

A cycle life curve is determined according to the value interval.

The first SOH of the battery pack corresponding to the number of charge and discharge cycles is calculated according to the cycle life curve.

The calculation of the first SOH of the battery pack is performed by the BMS.

The household energy storage system is specifically configured to, when calculating the number of service years of the battery pack, perform the steps described below.

A real-time clock is calibrated.

A battery production date is acquired.

Battery usage time is calculated according to the real-time clock and the battery production date.

The number of service years of the battery pack is determined according to the battery usage time.

The BMS has a real-time clock function, and the cloud platform can calibrate the real-time clock every day to ensure accurate timing.

The battery production date refers to the date entered by the BMS after the completion of battery production. The BMS calculates the battery usage time from the production date.

The household energy storage system is specifically configured to, when calculating the second SOH of the battery pack by using the number of service years, perform the steps described below.

A value interval in which the number of service years is located is determined.

A calendar life curve is determined according to the value interval.

The second SOH of the battery pack corresponding to the number of service years is calculated according to the calendar life curve.

The calculation of the second SOH of the battery pack is performed by the BMS.

The household energy storage system is specifically configured to, when calculating the limit discharge capacity of the battery pack, perform the steps described below.

A preset initial discharge capacity $C_{init}$ of the battery pack is acquired and the initial discharge capacity $C_{init}$ is used as an initial limit discharge capacity $C_{real}$ of the battery pack.

The limit discharge capacity $C_{real}$ of the battery pack is corrected in the embodiment where the battery pack satisfies a correction condition for the limit discharge capacity.

The correction condition is that the battery pack is discharged from a full charge state to a cut-off voltage in less than 24 hours, and temperature of the battery pack is kept at 15 to 45 degrees Celsius.

The step of correcting the limit discharge capacity $C_{real}$ of the battery pack by the household energy storage system includes the steps described below.

An amount of discharge of the battery pack discharged from the full charge state to the cut-off voltage is counted and the amount of discharge is used as a new limit discharge capacity $C_{new}$.

The new limit discharge capacity $C_{new}$ is given a weight of 60% and the limit discharge capacity $C_{real}$ is given a weight of 40%.

The limit discharge capacity $C_{real}$ is calculated and corrected according to the following formula: $C_{real}=C_{real}*40\%+C_{new}*60\%$.

The correction condition is that the usage time of the battery pack reaches the preset duration, the battery pack is charged to the full charge state, the battery pack is discharged from the full charge state to the cut-off voltage after standing for 30 minutes, and the temperature of the battery pack is kept at 15 to 45 degrees Celsius.

The step of correcting the limit discharge capacity $C_{real}$ of the battery pack by the household energy storage system includes the steps described below.

An amount of discharge of the battery pack discharged from the full charge state to the cut-off voltage is counted and the amount of discharge is used as a new limit discharge capacity $C_{new}$.

The new limit discharge capacity $C_{new}$ is given a weight of 100% and the limit discharge capacity $C_{real}$ is given a weight of 0%.

The limit discharge capacity $C_{real}$ is calculated and corrected according to the following formula: $C_{real}=C_{real}*0\%+C_{new}*100\%$.

When the correction condition for the battery discharge capacity is satisfied during use of the battery, the limit discharge capacity of the battery is corrected, and the system calculates the limit discharge capacity of the battery at intervals, so as to prevent an excessive error caused by long-term non-triggered discharge capacity correction during use of the battery. The cloud platform pushes the maintenance request, the EMS controls the battery system to perform a complete charge and discharge cycle, during which the BMS counts the accumulated discharge capacity of the battery from a point calibrating the end of charge to a point calibrating the end of discharge, that is, the newly calculated limit discharge capacity $C_{new}$ of the battery, and the limit discharge capacity $C_{real}$ of the battery is corrected.

The correction condition for the limit discharge capacity when the cloud platform starts capacity calculation is described. The battery is charged to the maximum cell voltage of 3400 mV at 0.35 C, then the current starts to decrease, and the battery is charged to the maximum cell voltage of 3600 mV at 0.05 C at the end of charging. After fully charged, the battery stands for 30 min and is continuously discharged to the point calibrating the end of discharge (the minimum cell voltage reaches 2900 mV) at 0.5 C, the temperature of the battery is kept between 15° C. and 45° C. during discharging, the net discharge capacity during discharging is counted, the discharge capacity, that is, the newly calculated limit discharge capacity $C_{new}$ of the battery, has a weight of 60%, the originally recorded limit discharge capacity $C_{real}$ of the battery has a weight of 0%, and the limit discharge capacity $C_{real}$ of the battery is calculated and corrected according to the following formula: $C_{real}=C_{real}*0\%+C_{new}*100\%$.

The household energy storage system is specifically configured to, when calculating the third SOH of the battery pack by using the limit discharge capacity, perform the step described below.

A percentage obtained by dividing the limit discharge capacity $C_{real}$ by the initial discharge capacity $C_{init}$ is used as the third SOH of the battery pack.

The calculation of the third SOH of the battery pack is performed by the BMS.

The household energy storage system is specifically configured to, when comparing the values of the first SOH, the second SOH, and the third SOH and taking the minimum value as the SOH of the battery pack, perform the steps described below.

Values of the first SOH and the second SOH are compared.

In the embodiment where the value of the first SOH is greater than or equal to the value of the second SOH, the value of the second SOH and the value of the third SOH are compared and the minimum value is taken as the SOH of the battery pack.

In the embodiment where the value of the first SOH is less than the value of the second SOH, the value of the first SOH and the value of the third SOH are compared and the minimum value is taken as the SOH of the battery pack.

The step of comparing the values of the first SOH, the second SOH, and the third SOH and taking the minimum value as the SOH of the battery pack is performed by any one or more of the BMS, the EMS, and the cloud platform.

Apparently, the embodiments described above are part, not all, of the embodiments of the present application, and the preferred embodiments of the present application are illustrated in the drawings and do not limit the scope of the present application. The present application may be embodied in many different forms. Conversely, these embodiments are provided so that the disclosure of the present application is thorough and complete. Although the present application is described in detail with reference to the preceding embodiments, for those skilled in the art, modifications can be made on the technical solutions in the preceding embodiments or equivalent substitutions can be made on part of the technical features therein. Any equivalent structures made on the basis of the specification and the drawings of the present application and direct or indirect utilization in other relevant fields fall within the scope of the present application.

What is claimed is:

1. A method for estimating a state of health (SOH), performed by a household energy storage system that comprises at least one battery pack, a cloud platform, an energy management system (EMS), and a battery management system (BMS) configured for a battery charge and discharge management and signal acquisition of the battery system, such that the at least one battery pack is able to actively perform a charge and discharge cycle for calculating an actual discharge capacity periodically, the EMS being configured to perform data interaction with the BMS and the cloud platform, the method comprising:
   counting, by the BMS, a number of charge and discharge cycles of the battery pack;
   calculating, by the BMS, a first SOH of the battery pack by using the number of charge and discharge cycles;
   calculating, by the BMS, a number of service years of the battery pack;
   calculating, by the BMS, a second SOH of the battery pack by using the number of service years;
   calculating, by the BMS and the cloud platform, a limit discharge capacity of the battery pack;
   calculating, by the BMS, a third SOH of the battery pack by using the limit discharge capacity; and
   comparing, by one or more of the BMS, the EMS, and the cloud platform, a value of the first SOH, a value of the second SOH, and a value of the third SOH and taking a minimum value as the SOH of the battery pack.

2. The method for estimating the SOH of the battery pack of claim 1, wherein estimating the number of charge and discharge cycles of the battery pack comprises:
   accumulating, by the BMS, a discharge capacity of the battery pack;
   in response to the discharge capacity reaching the limit discharge capacity of the battery pack, increasing, by the BMS, the number of charge and discharge cycles of the battery pack by one; and
   clearing the discharge capacity and re-accumulating the discharge capacity of the battery pack.

3. The method for estimating the SOH of the battery pack of claim 1, wherein calculating the first SOH of the battery pack by using the number of charge and discharge cycles comprises:
   determining a value interval in which the number of charge and discharge cycles is located;
   determining a cycle life curve according to the value interval; and
   calculating the first SOH of the battery pack corresponding to the number of charge and discharge cycles according to the cycle life curve.

4. The method for estimating the SOH of the battery pack of claim 1, wherein calculating the number of service years of the battery pack comprises:
   calibrating, by the cloud platform, a real-time clock;
   acquiring a battery production date entered by the BMS after a completion of the battery production;
   calculating, by the BMS, battery usage time according to the real-time clock and the battery production date; and
   determining the number of service years of the battery pack according to the battery usage time.

5. The method for estimating the SOH of the battery pack of claim 1, wherein calculating the second SOH of the battery pack by using the number of service years comprises:
   determining a value interval in which the number of service years is located;
   determining a calendar life curve according to the value interval; and
   calculating the second SOH of the battery pack corresponding to the number of service years according to the calendar life curve, wherein the calendar life curve is expressed according to formula:

$$f(y) = \begin{cases} 100 - y, & y \le 4 \\ 104 - 2y, & 4 < y \le 12 \\ 164 - 7y, & y > 12 \end{cases}$$

where y denotes the number of service years of the battery and f(y) denotes the second SOH of the battery pack corresponding to the number of service years.

6. The method for estimating the SOH of the battery pack of claim 1, wherein calculating the limit discharge capacity of the battery pack comprises:
   presetting an initial discharge capacity $C_{init}$ of the battery pack and using the initial discharge capacity $C_{init}$ as an initial limit discharge capacity $C_{real}$ of the battery pack, by the BMS; and
   correcting, by the BMS, the limit discharge capacity $C_{real}$ of the battery pack in response to the battery pack satisfying a correction condition for the limit discharge capacity.

7. The method for estimating the SOH of the battery pack of claim 6, wherein the correction condition for the limit discharge capacity is as follows:
   the battery pack is discharged from a full charge state to a cut-off voltage in less than 24 hours, and temperature of the battery pack is kept at 15 to 45 degrees Celsius.

8. The method for estimating the SOH of the battery pack of claim 7, wherein correcting the limit discharge capacity $C_{real}$ of the battery pack comprises:
   counting an amount of discharge of the battery pack discharged from the full charge state to the cut-off voltage and using the amount of discharge as a new limit discharge capacity $C_{new}$;

giving the new limit discharge capacity $C_{new}$ a weight of 60% and the limit discharge capacity $C_{real}$ a weight of 40%; and calculating and correcting the limit discharge capacity $C_{real}$ according to the following formula: $C_{real}=C_{real}*40\%+C_{new}*60\%$.

9. The method for estimating the SOH of the battery pack of claim 6, wherein the correction condition is as follows:

usage time of the battery pack reaches a preset duration, the battery pack is charged to a full charge state, the battery pack is discharged from the full charge state to a cut-off voltage after standing for 30 minutes, and temperature of the battery pack is kept at 15 to 45 degrees Celsius.

10. The method for estimating the SOH of the battery pack of claim 9, wherein correcting the limit discharge capacity $C_{real}$ of the battery pack comprises:

counting an amount of discharge of the battery pack discharged from the full charge state to the cut-off voltage and using the amount of discharge as a new limit discharge capacity $C_{new}$;

giving the new limit discharge capacity $C_{new}$ a weight of 100% and the limit discharge capacity $C_{real}$ a weight of 0%; and calculating and correcting the limit discharge capacity $C_{real}$ according to the following formula: $C_{real}=C_{real}*0\%+C_{new}*100\%$.

11. The method for estimating the SOH of the battery pack of claim 6, wherein calculating the third SOH of the battery pack by using the limit discharge capacity comprises:

using a percentage obtained by dividing the limit discharge capacity $C_{real}$ by the initial discharge capacity $C_{init}$ as the third SOH of the battery pack.

12. The method for estimating the SOH of the battery pack of claim 1, wherein comparing the value of the first SOH, the value of the second SOH, and the value of the third SOH and taking the minimum value as the SOH of the battery pack comprises:

comparing the value of the first SOH and the value of the second SOH;

in response to the value of the first SOH being greater than or equal to the value of the second SOH, comparing the value of the second SOH and the value of the third SOH and taking a minimum value as the SOH of the battery pack; and in response to the value of the first SOH being less than the value of the second SOH, comparing the value of the first SOH and the value of the third SOH and taking a minimum value as the SOH of the battery pack.

13. A household energy storage system, comprising:

a battery system comprising at least one battery pack, a cloud platform, an energy management system (EMS), and a battery management system (BMS); wherein:

the BMS is configured for a battery charge and discharge management and signal acquisition of the battery system, such that the at least one battery pack is able to actively perform a charge and discharge cycle for calculating an actual discharge capacity periodically, the EMS is configured to perform data interaction with the BMS and the cloud platform, and the household energy storage system is configured to:

count a number of charge and discharge cycles of the battery pack by the BMS;

calculate a first state of health (SOH) of the battery pack by using the number of charge and discharge cycles by the BMS;

calculate a number of service years of the battery pack by the BMS;

calculate a second SOH of the battery pack by using the number of service years by the BMS;

calculate a limit discharge capacity of the battery pack, by the BMS and the cloud platform;

calculate a third SOH of the battery pack by using the limit discharge capacity by the BMS; and compare a value of the first SOH, a value of the second SOH, and a value of the third SOH and take a minimum value as an SOH of the battery pack by one or more of the BMS, the EMS, and the cloud platform.

\* \* \* \* \*